June 25, 1963    W. H. SCIDMORE ETAL    3,094,790
OPTICAL DEVICE FOR DEMONSTRATING COMATIC ABERRATION
Filed Nov. 2, 1961

*INVENTORS.*
WRIGHT H. SCIDMORE
PAUL R. YODER, JR.
BY *S. J. Rotondi,*
*a. J. Dupont & S. Dubroff* ATTORNEYS:

United States Patent Office 3,094,790
Patented June 25, 1963

3,094,790
OPTICAL DEVICE FOR DEMONSTRATING COMATIC ABERRATION
Wright H. Scidmore, Langhorne, Pa., and Paul R. Yoder, Jr., Wilton, Conn., assignors to the United States of America as represented by the Secretary of the Army
Filed Nov. 2, 1961, Ser. No. 149,793
2 Claims. (Cl. 35—19)
(Granted under Title 35, U.S. Code (1952), sec. 266)

The invention described herein may be manufactured and used by or for the Government for governmental purposes without the payment to us of any royalty thereon.

The present invention relates to an optical device for demonstrating comatic aberration and more particularly to a device which demonstrates comatic aberration using only simple spherical lenses in fixed relationship to each other.

The devices in the prior art which have been used to study comatic aberration are costly and complex, and require many components. Ordinarily, components moveable relative to each other have been used exclusively. Also, since they are operable only by experienced technologists, they are useful only in advanced laboratory work.

The present invention, designed for demonstration purposes for students embarking on study of optics, makes use of simple spherical lenses which are in fixed relationship to each other and to an external diaphragm, to produce a display of coma while minimizing other aberrations.

It is an object of this invention to provide a device which is capable of producing a display of comatic aberration independently of other aberrations.

Another object is the provision of a device for purposes of demonstration which is inexpensive and which requires a minimum of special equipment.

A further object is the provision of demonstration equipment which requires little set-up time and is operable by instructor or student having a minimum of experience.

Other objects and advantages of the invention will hereinafter become more fully apparent from the following description of the annexed drawings, which illustrate a preferred embodiment, and wherein.

Figure 1:
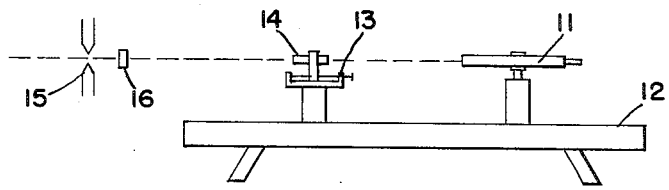
FIG. 1 is a schematic view in side elevation of a preferred embodiment of this invention.

Essentially, a preferred embodiment of this invention consists of telemicroscope 11 mounted on a lense bench 12. A nodal slide 13 mounted on said lens bench rotatably supports a lense assembly 14 in alignment with said telemicroscope 11. A concentrated light source 15 is aligned with elements 11 and 14 and separated therefrom by a filter 16.

The filter serves to isolate a particular broad-band spectral region to eliminate the lateral color which would otherwise be introduced with the coma in the lens assembly.

Figure 2:
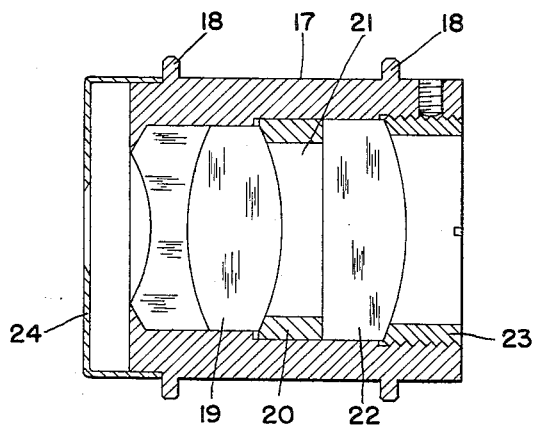
FIG. 2 is a section of a portion of the apparatus shown in FIG. 1.

The lens assembly shown in FIG. 2 consists of a cell 17 having bands 18 for ease in mounting. Within the cell is a cemented negative meniscus doublet 19, spacer 20 which provides an air space 21, a positive singlet 22 and retaining ring 23. A diaphragm 24 fixed to cell 17 at an end thereof between the light source and the lenses serves as aperture stop of the system and is located a short distance from the doublet 19. The position of the stop is chosen to eliminate astigmatism.

In one embodiment, the specifications of the lenses are as given in Table I:

Table I

| Lens | Radius (Inches) | Index ($N_D$) | V-Value | Thickness (Inches) |
|---|---|---|---|---|
| Doublet | −0.602 | 1.617 | 36.6 | 0.093 |
|  | +2.048 |  |  |  |
|  | −0.952 | 1.617 | 54.9 | 0.409 |
| Airspace |  |  |  | 0.152 |
| Singlet | +19.628 | 1.617 | 54.9 | 0.301 |
|  | −1.790 |  |  |  |

The size of the diaphragm is dependent upon the intensity of the light source, the distance of said source from the telemicroscope, and the diameter of the lens aperture. Practically, the diaphragm should be at least 0.250 inch and no larger than the aperture of the lenses; the minimum value being determined by that value at which the illumination of the image is seriously degraded.

It is frequently desirable for instructional purposes to provide a simple means of demonstrating the optical aberration coma in the laboratory independently of all other aberrations. The present invention accomplishes this result simply and directly.

Initially, the entire assembly is oriented so that light source, filter, lens assembly and telemicroscope are coaxial i.e., a straight line drawn between the light source and the telemicroscope will pass through the filter and the lense assembly. The image seen through the eyepiece is then essentially free of aberrations and appears as an Airy Disc in the color of the filter. When the lens assembly is rotated about its nodal point, which has previously been determined through standard use of the nodal slide, the image becomes a comatic blur whose size depends upon the angle of rotation and the aperture of the diaphragm.

It might be noted that the refractive index is the same for all elements; the correction being attained by positioning the stop and bending. Also, the particular lens used has zero Petzval curvature, enabling the image to be observed at various field angles without refocusing the telemicroscope.

It should now appear that we have invented a device which is simple to understand and operate, and which can be used to demonstrate comatic aberration with a minimum of effort, and to the exclusion of other aberrations. It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

We claim:

1. An optical system for demonstrating coma comprising a light source, a filter for isolating a particular broadband spectral region, a lens assembly coaxial with said light source and filter, said assembly being rotatable about an axis perpendicular to an optical axis thereof at a nodal point thereof, and means coaxial with said light source and said filter for viewing an image plane of said lens assembly under low magnification, whereby rotation of said lens assembly about a nodal point thereof causes an image of said light source in said image plane to appear as a comatic blur.

2. An optical system for demonstrating coma having a lens assembly comprising a cell containing a cemented negative meniscus doublet, a positive singlet rearwardly spaced, an airspace, means for holding said lenses in position, and a variable diaphragm forward of said meniscus doublet which forms the aperture stop of the lens assembly, said cemented negative meniscus doublet having outer air surfaces convex to rear viewing means for viewing an image plane of said assembly under low magnification rearwardly disposed and coaxial therewith, a concentrated light source forwardly said assembly and coaxial therewith at a distance of at least 25 times the focal length thereof, a filter disposed between said light source and said assembly to isolate a broad band spectral region, said lens assembly being rotatable about its nodal point whereby rotation of said lens assembly causes an image of said light source in said image plane to become a comatic blur whose size depends upon the angle of rotation and the aperture of said diaphragm, as seen through said viewing means.

References Cited in the file of this patent

UNITED STATES PATENTS 2,621,569   Glassey _____ Dec. 16, 1952

FOREIGN PATENTS 593,835   Great Britain _____ Oct. 27, 1947